Nov. 1, 1949     A. C. THORMODSGAARD     2,486,767
CLUTCH CONTROL
Filed March 16, 1948
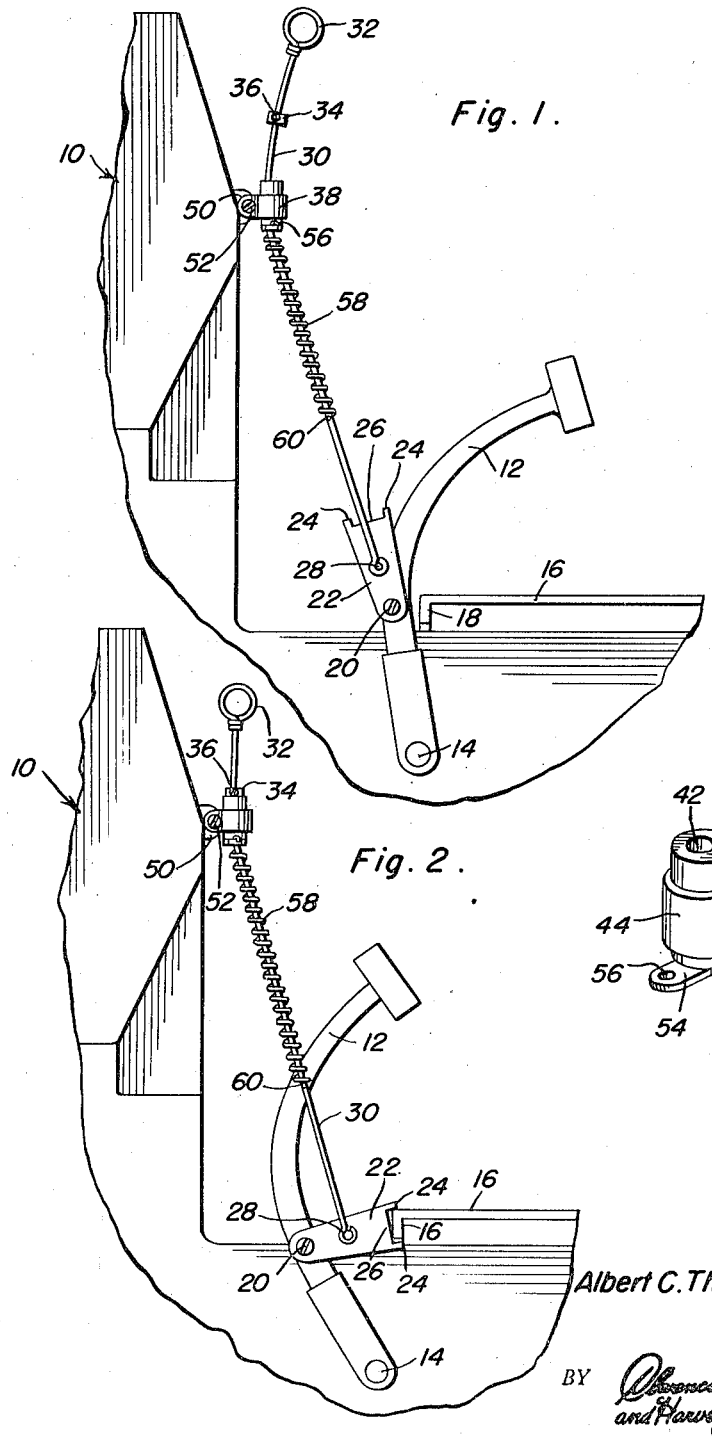
Albert C. Thormodsgaard
INVENTOR.

Patented Nov. 1, 1949

2,486,767

UNITED STATES PATENT OFFICE 2,486,767

CLUTCH CONTROL

Albert C. Thormodsgaard, Alcester, S. Dak.

Application March 16, 1948, Serial No. 15,200

3 Claims. (Cl. 74—535)

This invention relates to a novel clutch control and has for its primary object the provision of a manually operable lever for locking a clutch when the latter is disengaged and automatically releasing the same by merely depressing the clutch pedal.

Another object of the invention is to provide a manually operable control within ready reach of the driver of an automotive vehicle or tractor which obviates the necessity of stretching and reaching down beneath the driver's foot in order to lock the clutch pedal when the clutch is disengaged.

Still another object of the invention is the provision of a novel locking and releasing mechanism which allows the driver of the automotive vehicle or tractor to start the vehicle without the necessity of depressing the clutch pedal first to disengage the clutch. After the vehicle is started, merely depressing the clutch pedal a little further releases the locking mechanism automatically.

Yet another object of the invention is the provision of a locking and releasing device manually operated and conveniently located which allows the driver to lock the clutch pedal in disengaged position thus obviating the necessity for taking the engine out of gear.

These, together with various ancillary features and objects which will later become apparent as the following description proceeds, are attained by a device, a specific embodiment of which is shown and described in the accompanying drawings wherein:

Figure 1 is a side elevational view of the device of the instant invention attached to the chassis of a vehicle or tractor and in released position;

Figure 2 is a side elevational view of the device similar to Figure 1 showing the mechanism in locked position; and, Figure 3 is a perspective view of the means for slidably attaching the actuating rod or wire to the chassis.

In the following description of the drawings and in the specification similar reference characters indicate corresponding elements throughout. Generally indicated at 10 is a portion of an automotive vehicle or tractor chassis which is provided with a conventional clutch pedal 12 pivotally secured at the bottom thereof as at 14. Suitably secured to the bottom of the chassis to the rear of and immediately adjacent the clutch pedal is a lever retaining member 16 in the form of an angle iron which has an integral downwardly inclined depending arm 18 which is spaced from the base of the chassis at its extremity.

Pivotally secured to the clutch pedal adjacent the depending arm 18 as at 20 is a lever 22 which is provided at the extremity opposite the pivot point or fulcrum 20 with furcations 24 and a web portion 26.

Pivotally secured substantially at the center of the lever 22 as at 28 is a lever actuating rod 30 which is provided with an eye 32 at its top extremity through which a finger of the driver can be placed. At a suitable position below the eye 32 a stop 34 in the form of a metallic collar is removably secured to the actuating rod 30 by means of a suitable screw 36.

The rod 30 is slidably attached to the chassis 10 by means of a support 38 which is shown to better advantage in Figure 3. The support 38 consists of a cylinder 40 having an axial bore 42 for slidably receiving the rod 30. Embracing the cylinder 40 is a clamp 44 in the form of a collar having a pair of integral spaced lips 46 provided with apertures 48 therethrough. The support 38 is secured to the chassis 10 by means of an apertured lug 50 depending from the chassis which is slid between the lips 46. A suitable screw or bolt 52 is journalled through the apertures 48.

Depending from the cylinder 40 substantially perpendicular to the axis thereof is another lip 54 having an aperture 56 therethrough. Wound around the rod 30 is a spring 58 which at one extremity engages the aperture 56 and at the other extremity engages the rod intermediate the ends thereof through a suitable aperture 60.

The practical operation of the device is as follows. The clutch pedal is depressed and while in this position, the actuating rod is grasped by the finger of the driver at the eye 32 and moved downwardly. Lever 22 is caused to move downwardly to such an extent whereby the furcations engage and lock the retaining member 16 around the depending arm 18. In this position the spring 58 is extended. By merely depressing the clutch pedal further, the lever 22 is released, the spring 58 in contracting pulls the rod 30 upwardly, the lever 22 assuming a release position shown in Figure 1.

The device is particularly suitable for use in connection with conventional tractors, such as Case tractors.

Having described the invention, what is claimed as new is:

1. In a tractor having a frame, a clutch pedal, a retaining bar and a lock lever pivoted to said pedal adjacent said retaining bar; a means for selectively urging said lever into and out of locking engagement with said retaining bar comprising a rod having a finger receiving eye at one end thereof, said rod being secured at its other end to the lock lever, means for slidably retaining said rod on the frame, and a spring terminally secured to said retaining means and said rod substantially midway between the extremities of the latter, said spring being so disposed on the rod as to be extended when the lock lever engages the retaining bar.

2. The combination of claim 1 wherein said retaining means includes a cylinder having an axial bore, an apertured lip integral with the bottom portion of said cylinder, a clamp embracing said cylinder above said lip, and means for securing said clamp to the frame, said spring being retained at one of its ends on said apertured lip.

3. The combination of claim 2 and a stop carried by said rod adjacent said eye for limiting the downward movement of said rod.

ALBERT C. THORMODSGAARD.

REFERENCES CITED

The following references are of record in the file of this patent:

UNITED STATES PATENTS

| Number | Name | Date |
| --- | --- | --- |
| 1,249,260 | Walker | Dec. 4, 1917 |
| 1,443,949 | Fuller | Feb. 6, 1923 |
| 1,507,540 | Williams | Sept. 2, 1924 |
| 1,840,960 | Krueger | Jan. 12, 1932 |
| 2,308,898 | Skareen | Jan. 19, 1943 |